(12) United States Patent
Fay et al.

(10) Patent No.: US 11,996,925 B2
(45) Date of Patent: May 28, 2024

(54) DYNAMIC ANTENNA CONFIGURATION

(71) Applicant: Sony Group Corporation, Tokyo (JP)

(72) Inventors: Luke Fay, San Diego, CA (US); Graham Clift, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 189 days.

(21) Appl. No.: 17/525,870

(22) Filed: Nov. 13, 2021

(65) Prior Publication Data

US 2023/0079214 A1 Mar. 16, 2023

Related U.S. Application Data

(60) Provisional application No. 63/261,115, filed on Sep. 13, 2021.

(51) Int. Cl.
*H04B 7/08* (2006.01)
*G01S 3/72* (2006.01)
*G01S 3/786* (2006.01)
*H04H 40/90* (2008.01)
*H04W 4/02* (2018.01)

(52) U.S. Cl.
CPC ............... *H04B 7/086* (2013.01); *G01S 3/72* (2013.01); *G01S 3/7864* (2013.01); *H04B 7/0802* (2013.01); *H04H 40/90* (2013.01); *H04W 4/027* (2013.01)

(58) Field of Classification Search
CPC ......... H04B 7/086; H04B 7/0802; G01S 3/72; G01S 3/7864; H04H 40/90; H04W 4/027
See application file for complete search history.

(56) References Cited

U.S. PATENT DOCUMENTS

| 5,777,693 | A | * | 7/1998 | Kishigami | ......... | H04N 21/4383 |
| | | | | | | 348/731 |
| 7,050,787 | B2 | | 5/2006 | Caci | | |
| 8,224,348 | B2 | | 7/2012 | Bolon et al. | | |
| 10,736,074 | B2 | | 8/2020 | Edge et al. | | |
| 11,451,853 | B1 | | 9/2022 | Ansfield | | |
| 2020/0218901 | A1 | | 7/2020 | Elder | | |

FOREIGN PATENT DOCUMENTS

| EP | 0725489 A1 | 8/1996 |
| WO | WO-2019068568 A1 * | 4/2019 |

OTHER PUBLICATIONS

Advanced Television Systems Committee: "ATSC A/331:2017 ATSC Standard: Signaling, Delivery, Synchronization, and Error Protection", ATSC Standard, Dec. 6, 2017 (Dec. 6, 2017), pp. 1-194, XP055530902.

(Continued)

*Primary Examiner* — Yassin Alata
(74) *Attorney, Agent, or Firm* — John L. Rogitz; John M. Rogitz

(57) ABSTRACT

Techniques are described for expanding and/or improving the Advanced Television Systems Committee (ATSC) 3.0 television protocol in robustly delivering the next generation broadcast television services. A receiver uses relative location and direction of motion of the receiver with respect to each broadcaster to determine which tuner/demodulator(s) to use to present a service and which to use to scan for services.

20 Claims, 8 Drawing Sheets

(56) References Cited

OTHER PUBLICATIONS

ARIB Organization: "Broadband Mobile Wireless Access System (WiMAX(TM) applied in Japan)", "WiMAX Forum Network Architecture, Protocols and Procedures for Location Based Services", WMF-T33-110-R015v02, Nov. 14, 2011, ARIB, Association of Radio Industries and Businesses, (continued).
Nittochi Bldg., 1-4-1, Kasumigaseki, Chiyodaku, Tokyo 100-0013, Japan Dec. 15, 2020 (Dec. 15, 2020), XP017861495, Retrived from the Internet: URL: http://www.arib.or.jp/english/html/overview/doc/STD-T94v4_0.zipSTD-T94v4_0/4-2-11_WMF-T33-110-R015v02_LBS.pdf [retrieved on Dec. 15, 2020].
ATSC Organization: "A/331:2022—Signaling, Delivery, Synchronization, and Error Protection", ATSC, Advanced Television Systems Committee, 1776 K Street N.W., Washington, D.C. 20006, USA, Mar. 31, 2022 (Mar. 31, 2022), XP017863511.

\* cited by examiner

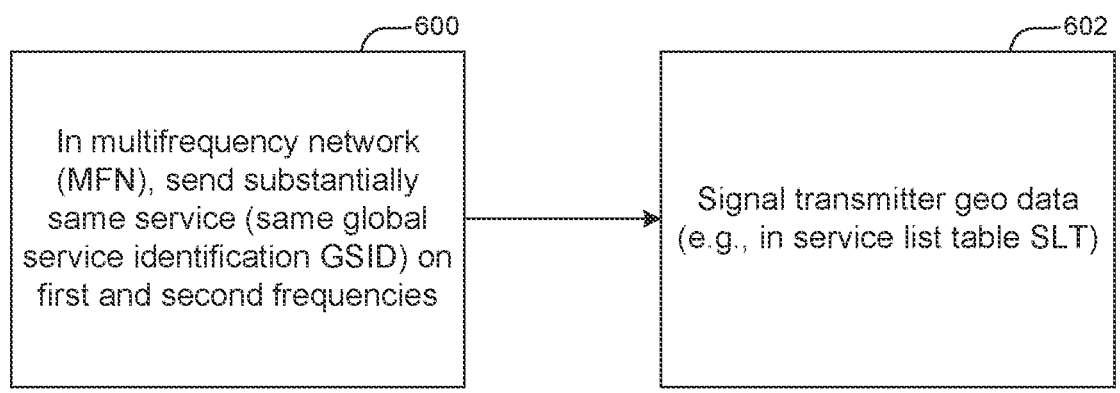
FIG. 6  Transmitter

FIG. 8 Train Machine Learning Model

DYNAMIC ANTENNA CONFIGURATION

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in A/300 for delivering the next generation of broadcast television. ATSC 3.0 supports delivery of a wide range of television services including televised video, interactive services, non-real time delivery of data, and tailored advertising to a large number of receiving devices, from ultra-high-definition televisions to wireless telephones. ATSC 3.0 also orchestrates coordination between broadcast content (referred to as "over the air" or OTA) and related broadband delivered content and services (referred to as "over the top" or OTT). ATSC 3.0 is designed to be flexible so that as technology evolves, advances can be readily incorporated without requiring a complete overhaul of any related technical standard.

As understood herein, an ATSC 3.0 receiver scans for services including in reception areas that contain two or more frequencies carrying the same service, as may occur in a boundary region in which broadcast signals from two regional ATSC 3.0 broadcaster stations overlap. These boundary regions exist in a multifrequency network (MFN).

SUMMARY

As further understood herein, a broadcast digital TV receiver should choose to tune to the RF broadcast which it is able to receive with the strongest, most error-free signal, but this represents a small set of information. Present principles provide techniques for how a receiver can automatically improve and optimize reception based on information about its location, speed, and direction and the transmitter location(s).

Accordingly, in digital television in which at least one receiver can receive broadcast signals, a method includes identifying respective locations of the transmitters, identifying a location of the receiver and at least one parameter of motion of the receiver, and based at least in part on the respective locations of the transmitters, the location of the receiver, and the parameter of motion of the receiver, identifying at least a first tuner of a multi-tuner chip to provide signals to a primary demodulator or decoder. The method includes using an output of the primary demodulator or decoder to present a demanded service on at least one display. The method further includes, based at least in part on the respective locations of the transmitters, the location of the receiver, and the parameter of motion of the receiver, identifying at least a second tuner of the multi-tuner chip to scan for a duplicate of the demanded service.

The multi-tuner chip may include four tuners.

In non-limiting embodiments, the method can include, responsive to the second tuner not detecting a duplicate of the demanded service, tuning the second tuner to a frequency associated with the demanded service and providing an output of the second tuner to the primary demodulator or decoder.

In some examples the method can include using plural tuners including the first tuner of the multi-tuner chip to provide signals to the primary demodulator or decoder, and responsive to identifying that the first tuner provides a signal satisfying a threshold, switching others of the plural tuners from providing signals to the primary demodulator or decoder to providing signals for scanning for the duplicate of the demanded service.

The parameter of motion may include direction and/or speed.

The method can include identifying at least the first tuner of the multi-tuner chip to provide signals to the primary demodulator or decoder at least in part using at least one machine learning (ML) model.

In another aspect, an apparatus includes at least one receiver configured to configure at least first antenna input to a primary demodulator or decoder based at least in part on a motion parameter of the receiver and configure at least second antenna input to a secondary demodulator or decoder based at least in part on the motion parameter of the receiver.

In another aspect, a digital television apparatus includes at least one receiver with at least one processor programmed with instructions to configure the processor to use a first tuner to provide input to a primary demodulator or decoder to present a demanded digital TV service. The instructions are executable to use a second tuner to provide input to a secondary demodulator or decoder to scan for a duplicate of the demanded digital TV service. Further, the instructions are executable to switch at least one of the tuners to provide input to a different demodulator or decoder at least in part based on at least one motion parameter of the receiver.

The details of the present application, both as to its structure and operation, can best be understood in reference to the accompanying drawings, in which like reference numerals refer to like parts, and in which:

BRIEF DESCRIPTION OF THE DRAWINGS

FIG. 6 illustrates example transmitter logic in example flow chart format consistent with present principles;

DETAILED DESCRIPTION

Figure 1:
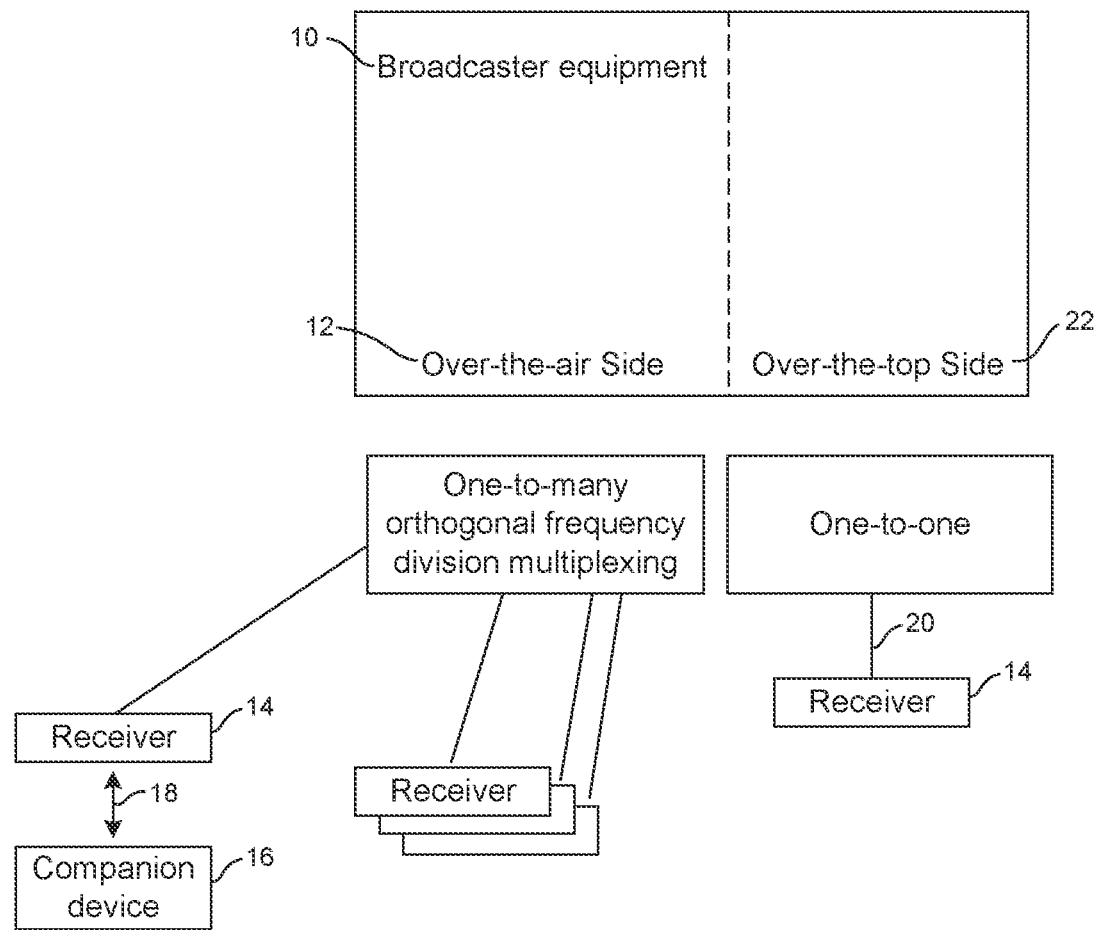
FIG. 1 illustrates an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access web sites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable universal serial bus (USB) thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

A recitation of "having at least one of A, B, and C" (likewise "having at least one of A, B, or C" and "having at least one of A, B, C") includes alone, B alone, C alone, A and B together, A and C together, B and C together, and/or A, B, and C together, etc.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). Note that computerized devices described in all of the figures herein may include some or all of the components set forth for various devices in FIGS. 1 and 2.

Figure 2:
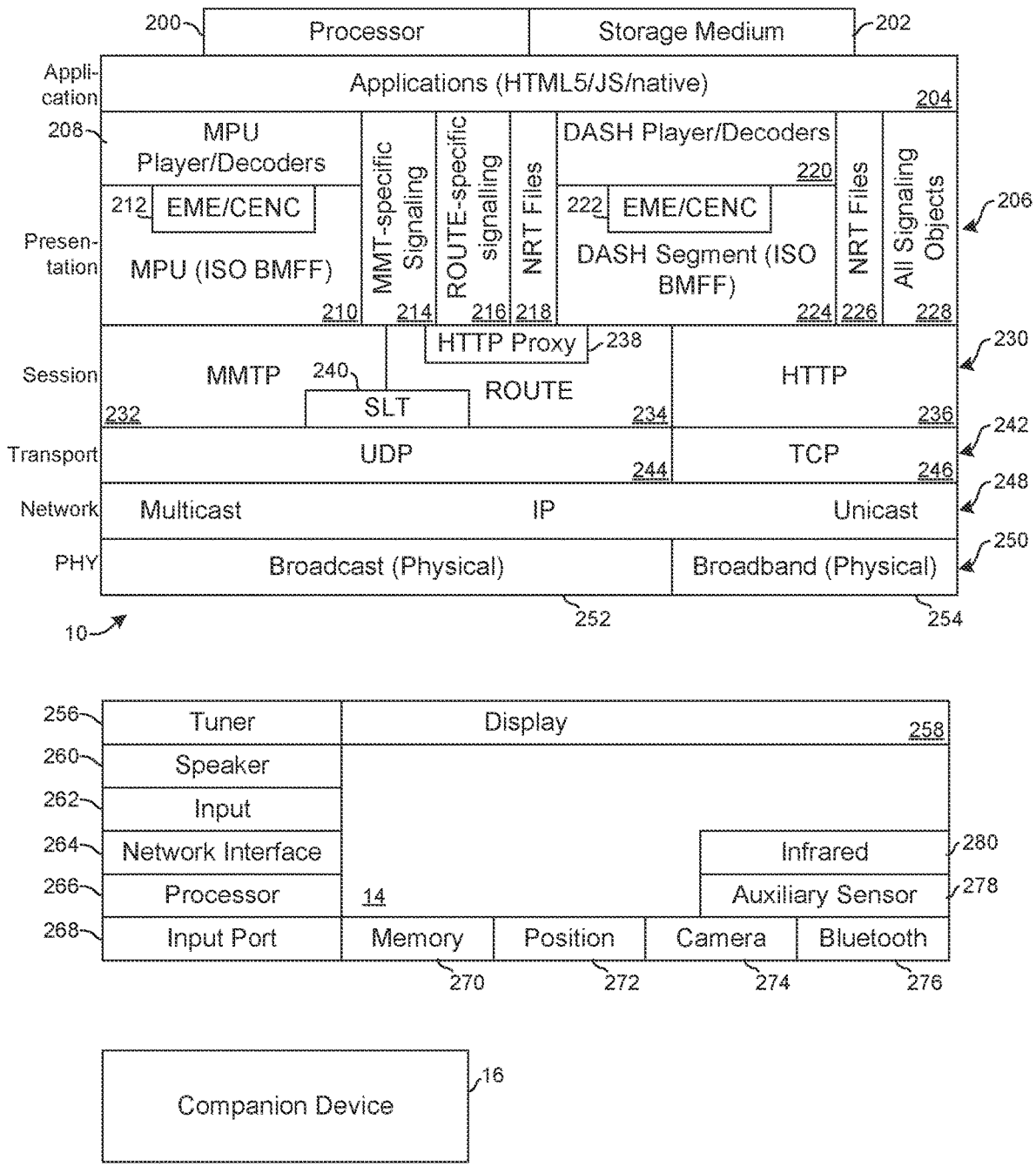
FIG. 2 illustrates components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC-4) format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234. Note that the ATSC standard provides an option to use MPEG MMT for transport, though it is not shown here.

On the broadband side the session layer 230 includes HTTP protocol 236 which may be implemented as HTTP-secure (HTTP(S)). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses (UDP 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile sent through the various protocols (HTTP/TCP/IP) in the protocol stack may be used on the broadband side. Media files in the DASH-IF profile based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g., communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high-definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g., all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
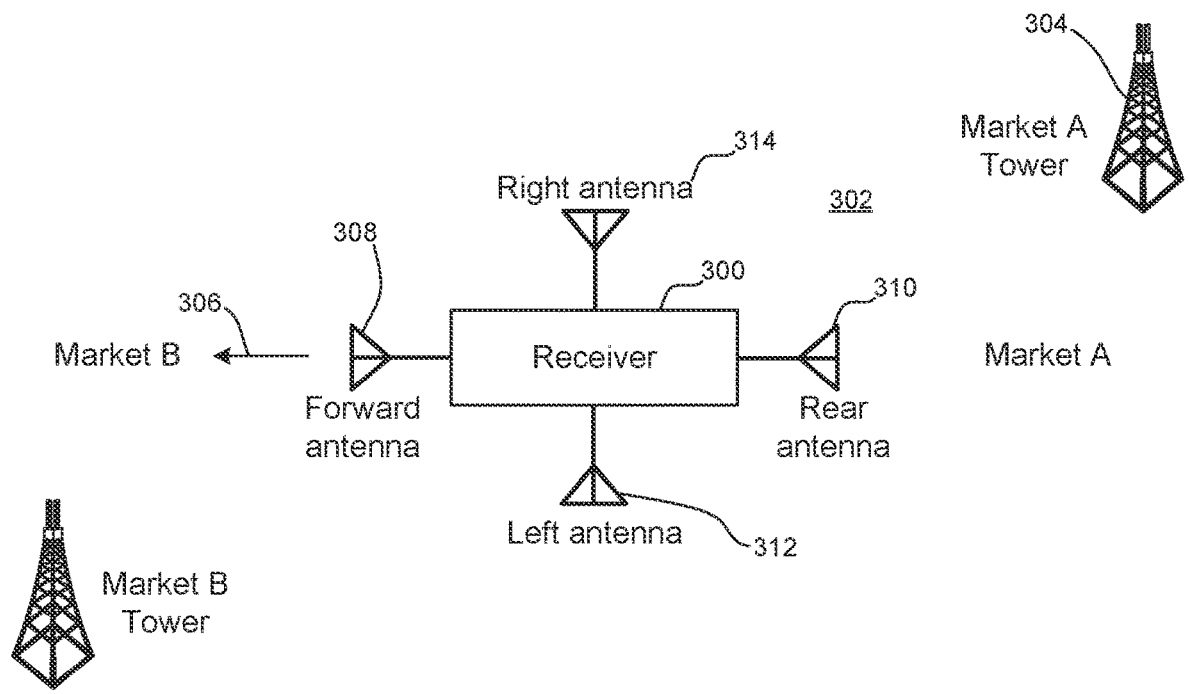
FIG. 3 illustrates an example specific system.

Now referring to FIG. 3, a simplified digital TV system such as an ATSC 3.0 system is shown. In FIG. 3, a mobile or stationary digital TV receiver such as an ATSC 3.0 receiver 300 that may include any or all of the relevant components discussed above in relation to FIGS. 1 and 2 is located in a boundary region 302 between first and second ATSC 3.0 broadcast stations or assemblies 304, with signals from both broadcast stations 304 potentially being picked up by the receiver 300 in the region 302. A first ATSC 3.0 service ("Service A") is broadcast from the first broadcast station 304 over a first frequency, whereas the same service A or a substitute therefor is broadcast from the second broadcast station 304 over a second frequency different from the first frequency. The receiver 300 potentially picks up both frequencies, i.e., the receiver 300 picks up signals from both broadcast stations 304.

In the example shown, the receiver 300 is a mobile receiver on, e.g., a vehicle that is moving as indicated by the arrow 306 toward the second station 304. The receiver 300 may include a first antenna 308 mounted on the front of the receiver or vehicle or chip on which the receiver is implemented, a second antenna 310 mounted on the rear, and third and fourth antenna 312, 314 mounted on opposite sides as shown.

Present principles control an antenna (or series of antennas) to point to a transmitting tower 304 shown in FIG. 3 provided the angle of arrival is worked out with either GPS coordinates or dead-reckoning sensors along with direction of travel rather than use patterns of received signal energy. Adaptive selection of which antenna is used provides the best possible signal energy in a signal search. The example shown in FIG. 3 is using four antennas mounted on a vehicle moving from market A to market B as shown by the arrow 306. Forward facing antennas would be better suited to search for new signal rather than the rear-facing antenna.

In FIG. 3, the rear facing antenna 310 and right-side antennas 314 could be used in a 2-diversity combination to continue watching current programming. The left-side antennas 312 would not be of much help. It will be appreciated that receivers move and change direction constantly. Selection of proper antennas to track best angle of signal arrival enables a receiver to use its optimally placed antennas to combine signal energy positively and not have any destructive interference be combined into (e.g., MRC) combination algorithm.

Correct antenna selection requires location awareness or knowledge. This can be available with dead-reckoning sensors in vehicles including those described above along with speedometer, directional compass, telematics units, etc. and broadcasters can emit signaling of their own (GPS coordinate) locations. This allows receivers to compute their location in relation to signal emitting towers and turn on/directionally point antennas to that tower for either receiving current programming or search for the next available signal in a coming market.

The combination of primary/secondary demodulators and how/when to use secondary demodulator in pointing where to go next involves several parameters.

Figure 4:
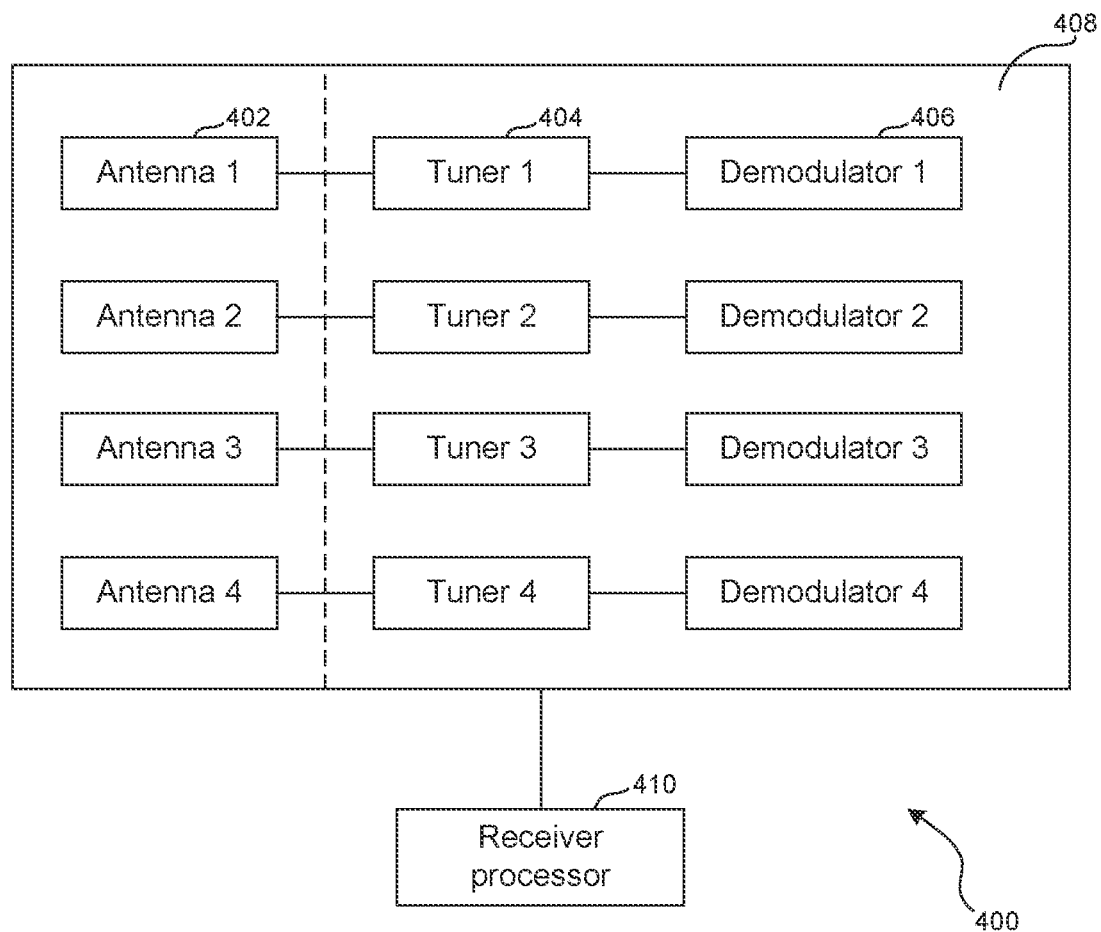
FIG. 4 illustrates a first example embodiment of a digital TV receiver.

FIG. 4 illustrates an example non-limiting embodiment of a digital TV receiver such as an ATSC 3.0 receiver 400 that may include any or all of the relevant components discussed above in relation to FIGS. 1 and 2. In the example shown, the ATSC 3.0 receiver 400 may include first through fourth antenna 402 feeding respective tuners 404 that in turn feed respective demodulators 406. At least the tuners and demodulators may be implemented on a chip 408. Signals from the demodulators 406 may be sent one or more receiver processors 410.

Figure 5:
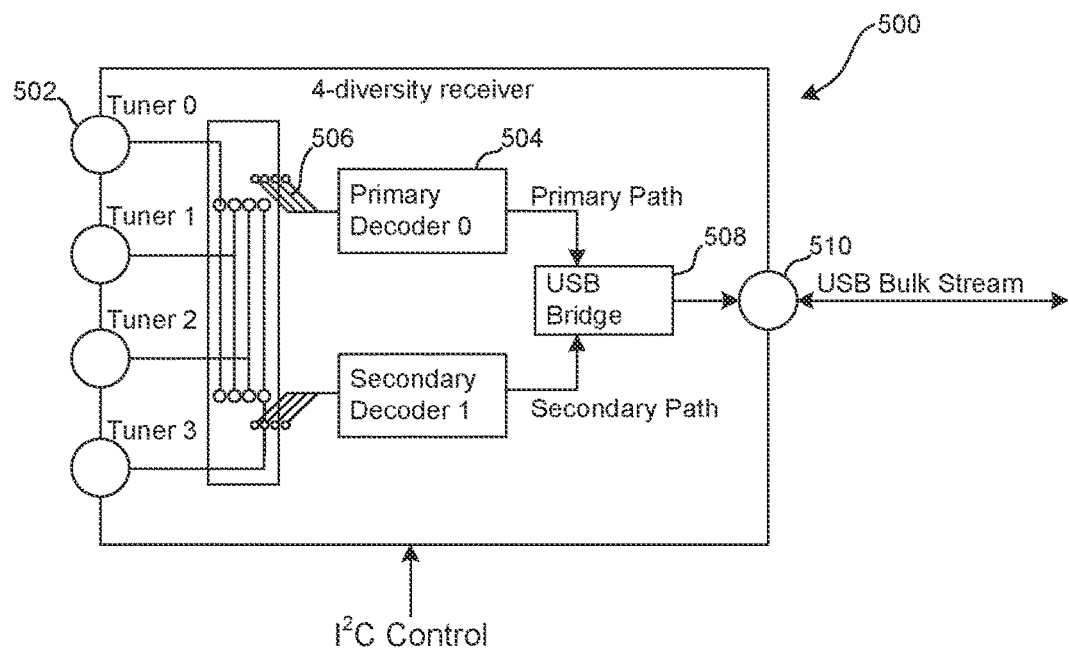
FIG. 5 illustrates a second example embodiment of a digital TV receiver.

In contrast, FIG. 5 illustrates an example non-limiting embodiment of a digital TV receiver such as an ATSC 3.0 receiver 500 that may include any or all of the relevant components discussed above in relation to FIGS. 1 and 2. Signal SNR or packet error loss or knowledge of location can all be used to feed a decision algorithm making the choice of when to search for a new signal and when to switch to that new signal.

In the example shown, the ATSC 3.0 receiver 500 may be a mobile receiver, e.g., as by being implemented in a mobile phone or being disposed in a moving vehicle. In some examples, the ATSC 3.0 receiver 500 may be a stationary receiver, e.g., a receiver located inside a home.

The example ATSC 3.0 receiver 500 shown in FIG. 5 includes plural tuners 502 (four, in the example shown) sending signals to demodulators or decoders 504 picked up by the tuners from one or more antennae. In the non-limiting example shown, the ATSC 3.0 receiver 500 has four tuners and two demodulators or decoders with two tuners feeding a first or primary demodulator or decoder and two other tuners feeding a secondary demodulator or decoder, it being understood that the receiver may have a greater or lesser number of tuner/demodulators. The receiver 500 may have the capability to switch antennae input to the tuners as indicated by the switches 506, such that a first tuner may receive signals from, e.g., three antennae and a second tuner may receive signals from the fourth antenna, and then a switch may be made to swap antenna input between the tuners. Two antennae may provide input to each respective tuner. All four antennae may provide input to a single tuner. These and other antenna-tuner configurations can be changed on the fly during operation as needed.

The demodulators or decoders 504 can provide input to a USB bridge 508 to output at 510 a USB bulk video stream.

Either one of the receivers 400, 400 in FIGS. 4 and 5 may be implemented by Sony Semiconductor's CXD2885GL 'CLOVER' chip which contains four tuners/demodulators. In addition to the four tuners, there is a maximal ratio combining (MRC) algorithm to combine received energy from selected tuners in two separate paths. This allows the receiver to continue decoding a signal of interest, while allowing for another tuner to search for other possible signals. In some embodiments the antennae can be steered physically or electronically.

Quality metrics of RF frequencies are discussed herein and may be identified and stored. The quality metrics can include, e.g., signal to noise ratio (SNR) and error rate as may be represented by, e.g., packet error number (PEN). The quality metrics can include resolution, e.g., whether a service is in high definition (HD) or standard definition (SD). The quality metric also can include bitrate and form-factor, recognizing that not all HD is the same. The quality metrics can include content attributes such as whether a service supports foreign languages, accessibility signaling (e.g., where signing is being done), audio description, and other content aspects. The quality metrics can include locality preference (such as a first region channel being strong, but all the ads are for the first region and not a second region preferred by the user so that a duplicate service from the second region may be accorded preference over the first region). The quality metrics can include quality of user interfaces carried in the service.

In non-limiting examples SNR may be determined during the scan by noting both the received signal strength of each received frequency and any accompanying noise on that frequency and determining the quotient thereof. Error rate may be determined by, e.g., determining a percentage of packets missed (by noting missing packet numbers) and/or by determining a percentage of received packets with errors in them as determined by error correction algorithms.

FIG. 6 illustrates logic executable by a transmitter such as an OTA transmitter or OTT transmitter. When an ATSC 3.0 receiver, particularly (but not limited to) a mobile device encounters a set of two or more RF broadcasts where two or more RF broadcasts include programming which is identified as substantially the same (for example, by having identical globalServiceId values). The receiver should choose to tune to the RF broadcast which it is able to receive with the strongest, most error-free signal. Absent present principles, a receiver must choose based on only signal strength or error rates encountered at the current time or in the past.

Indeed, present principles enable a receiver to choose the best RF broadcast to tune to based on information of the receiver's location, direction and speed of travel, transmitter locations, topographical features of the receiver and transmitter locations. For example, if encountering two equivalent signals while traveling in the direction of one of those signals, a receiver should probably tune to the transmission it is moving toward. On the other hand, if there is a topographical feature (like a mountain) which will decrease the signal quality if the receiver continues at its current heading and speed, then the receiver might choose to tune to a broadcast not subject to the signal quality issues due to the mountain until after the mountain is no longer affecting the signal quality. Note that a light direction and ranging (LI- DAR) apparatus associated with, e.g., the receiver may be used to generate a topographical map.

Additionally, using information described above, a receiver can utilize the above information (particularly transmitter locations and receiver location) to automatically adjust antenna configuration to maximize reception (for example, by controlling an antenna rotator, or an antenna's beamforming capabilities).

Also, a machine learning (ML) model process can utilize the above information to predict the best reception parameters (antenna configuration) and best transmission to tune to in a more-accurate more-efficient way.

Accordingly, turn now to FIG. 6. Commencing at block 600, in a MFN such as an ATSC 3 broadcast network, two or more transmitters, which may be wireless broadcast transmitters and/or broadband transmitters, send substantially the same digital TV service at substantially the same time, albeit in the case of broadcasters on different frequencies if desired. "Substantially the same service" in some embodiments can refer to two duplicate versions of the same service having the same global service identifier (GSID), which refers to the attribute @globalServiceID in table 6.2 (SLT) of A/331. "Substantially the same service" in some embodiments can refer to two duplicate versions of the same service having the same broadcast stream identification (BSID). "Substantially the same service" in some embodiments can refer to a service that is an acceptable replacement for the service being replaced, for example, services in which signaling indicates a second service is a replacement or equivalent for a first service.

Proceeding to block 602, each transmitter can signal its respective geo location data, e.g., latitude, longitude, elevation. This signaling may be inserted into a SLT.

Figure 7:
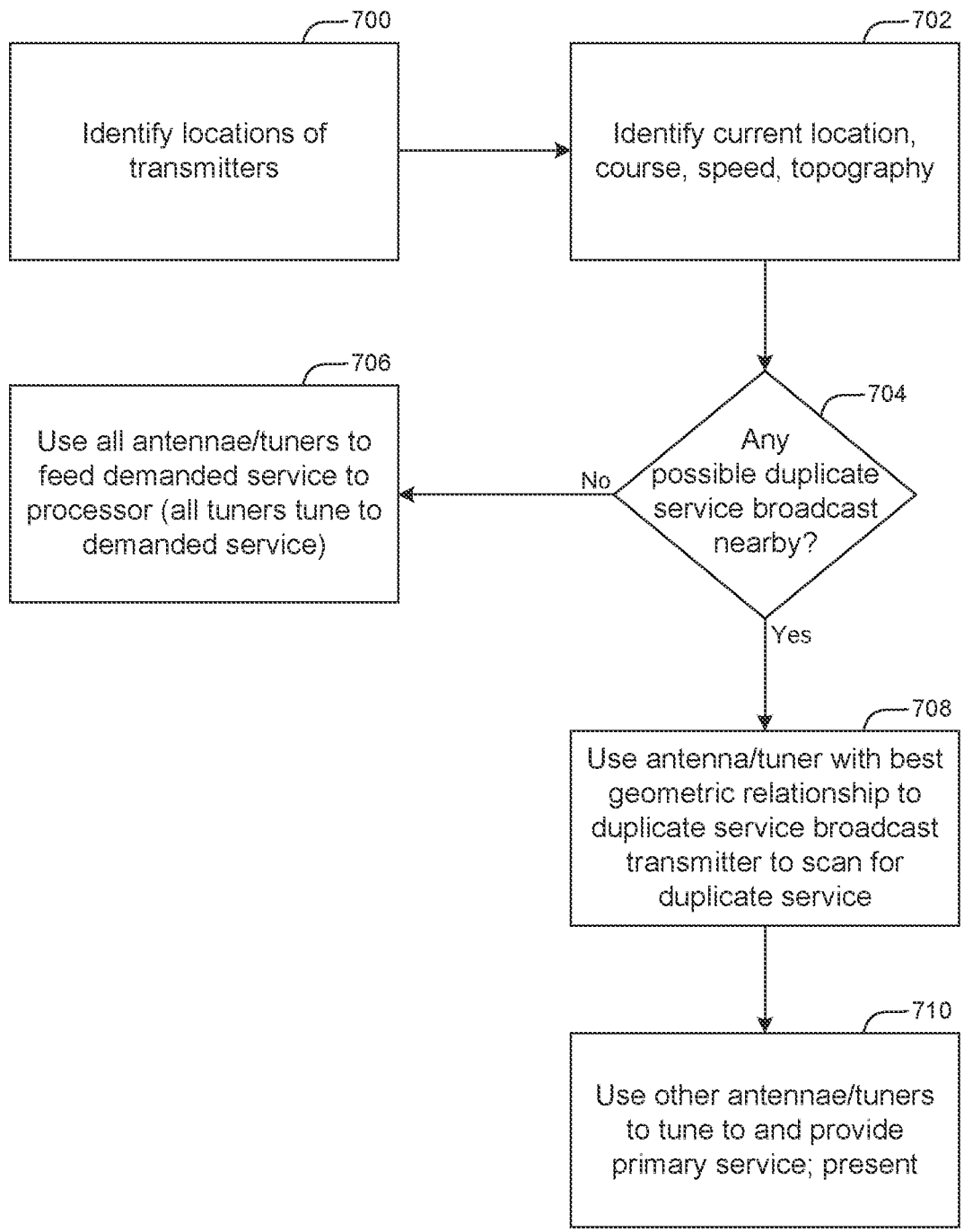
FIG. 7 illustrates example receiver logic in example flow chart format consistent with present principles.

FIG. 7 illustrates receiver side logic. Commencing at block 700, the locations of digital TV broadcast transmitters are identified, e.g., using received signaling or using a digitally stored map of transmitter locations and considering only those within a threshold distance of the receiver. The current location of the receiver is indicated at block 702 as being identified along with the current course and speed of the receiver and if desired topographical information about the local surroundings as obtained from a digital map or detected by, e.g., radar or lidar.

As understood herein, diversity of tuners provides SNR gain, antennas that point toward the direction of a best-received demanded service may be used to present the service with one antenna dedicated for searching. This provides higher SNR results for the demanded service. If it is determined at decision diamond 704 (from, e.g., accessing a map indicating that no alternative transmitter is within a threshold distance of the receiver or from a complete lack of signal from the scanning antenna/tuner) that there is no indication of other possible duplicate service nearby, all four antennae/tuners can be dedicated to the demanded service at block 706. If there is an indication of a second or duplicate service, at block 708 the antenna with the best possible geometric location with respect to the transmitter of the duplicate service may be used for scanning for the duplicate service. That antenna likely will be in the front of the vehicle (direction of travel) when the receiver is mounted on a vehicle. The remaining antennae/tuners are used at block 710 to tune to and provide the demanded service for presentation on a display.

Figure 8:
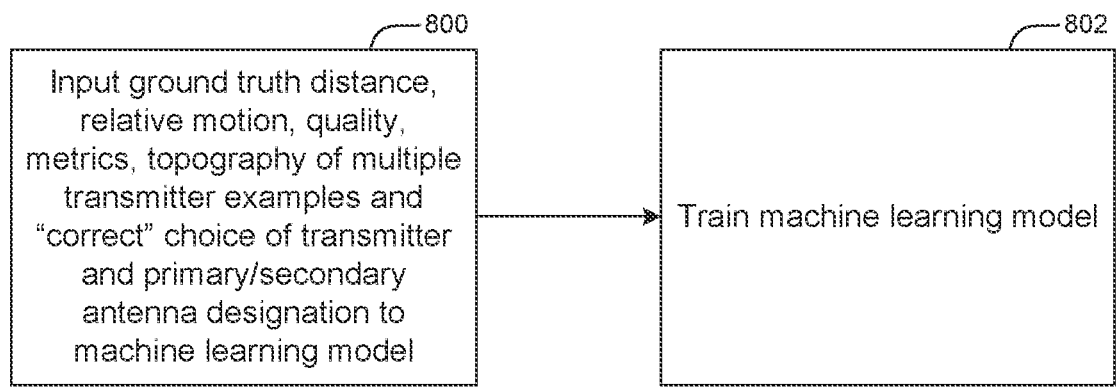
FIG. 8 illustrates logic for training a machine learning (ML) model in example flow chart format consistent with present principles.

Antenna selection may be accomplished using at least one ML model which may be trained starting at block 800 in FIG. 8. Ground truth is input to the ML model. The ground truth may include latitudes, longitudes, and elevations of actual digital TV broadcaster transmitters, superimposed on a topographical map of the surrounding environs. The ground truth may include these features only for a region, or for a nation, or for the entire globe.

The ground truth also may include plural hypothetical receiver locations, courses, and speeds along with hypothetical signal quality metrics or quality metrics actually measured at the locations by test vehicles. The ground truth may include correct antenna/tuner-to-primary or secondary demodulator or decoder assignation (i.e., correct "antenna configuration"). The ground truth may include an indication of which of two frequencies is the best selection at each hypothetical receiver location. The ML model is trained at block 802 based on the ground truth input at block 800, for subsequent use in receivers executing the Ml model.

As examples of ground truth correlations that may be used to train the ML model, a first antenna/tuner providing signals with better quality metrics than a second frequency may be selected as a primary antenna/tuner to provide the demanded service when the receiver is stationary. The second antenna/tuner may be used to scan for a duplicate service (selected as input to a secondary demodulator or decoder).

A first a first antenna/tuner providing signals with better quality metrics than a second a first antenna/tuner may be selected as a primary antenna/tuner to provide the demanded service when the receiver is stationary, and no topographical obstructions lie between the receiver and the transmitter sending the service on the first frequency. The second antenna/tuner may be used to scan for a duplicate service (selected as input to a secondary demodulator or decoder).

In some embodiments a first a first antenna/tuner providing signals with lower quality metrics than a second antenna/tuner may be selected as a primary antenna/tuner to provide the demanded service when the receiver is stationary and at least one topographical obstruction lies between the receiver and the transmitter sending the service detected by the first antenna/tuner. The second antenna/tuner may be used to scan for a duplicate service (selected as input to a secondary demodulator or decoder).

In some embodiments a first antenna/tuner providing signals with better quality metrics than a second antenna/tuner by a significant amount, such as an SNR differential above a threshold, may be selected as a primary antenna/tuner to provide the demanded service when the receiver is stationary and at least one topographical obstruction lies between the receiver and the transmitter sending the service. The second antenna/tuner may be used to scan for a duplicate service (selected as input to a secondary demodulator or decoder).

In some embodiments a first antenna/tuner providing signals with lower quality metrics than a second antenna/tuner may be selected when the receiver is moving toward the transmitter sending the service. The second antenna/tuner may be used to scan for a duplicate service (selected as input to a secondary demodulator or decoder).

In some embodiments a first antenna/tuner providing signals with lower quality metrics than a second antenna/tuner may be selected as a primary antenna/tuner to provide the demanded service only if the receiver is moving toward the transmitter by at least a threshold velocity. The second antenna/tuner may be used to scan for a duplicate service (selected as input to a secondary demodulator or decoder).

In some embodiments a first antenna/tuner providing signals with lower quality metrics than a second antenna/tuner may be selected as a primary antenna/tuner to provide the demanded service only if the receiver is moving toward the transmitter sending the service and no obstructions exist between the receiver and the transmitter. The second antenna/tuner may be used to scan for a duplicate service (selected as input to a secondary demodulator or decoder).

In some embodiments a first antenna/tuner providing signals with lower quality metrics than a second antenna/tuner may be selected as a primary antenna/tuner to provide the demanded service only if the receiver is moving toward the transmitter whose signal is tuned to by the first tuner and an obstruction exists between the receiver and the transmitter whose signal is tuned to by the second tuner. The second antenna/tuner may be used to scan for a duplicate service (selected as input to a secondary demodulator or decoder).

In some embodiments a first antenna/tuner providing signals with lower quality metrics than a second antenna/tuner may be selected as a primary antenna/tuner to provide the demanded service if the receiver is moving toward the transmitter being tuned to by the first tuner, an obstruction exists between the receiver and the transmitter sending the service tuned to by the first tuner, but the elevation of the transmitter sending the service tuned to by the first tuner is higher than the obstruction. The second antenna/tuner may be used to scan for a duplicate service (selected as input to a secondary demodulator or decoder).

These are but some example heuristics that may be used to select an antenna/tuner as a primary or secondary antenna/tuner.

Figure 9:
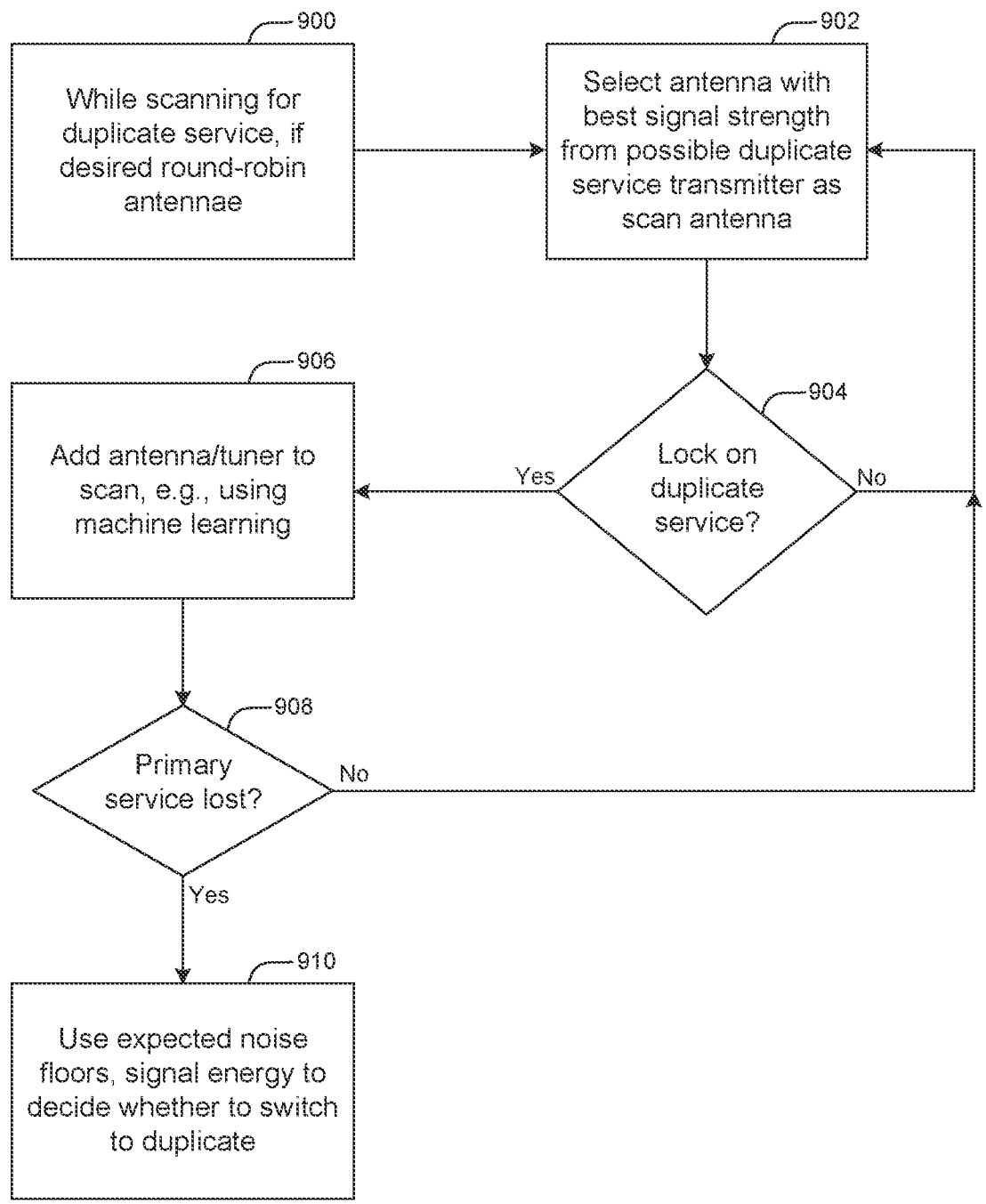
FIG. 9 illustrates additional example receiver logic in example flow chart format consistent with present principles.

FIG. 9 illustrates at block 900 that the primary service can continue playing while possibly flipping around which tuners are in use for both primary and secondary demodulators using, e.g., a round-robin approach. At block 902 the antenna/tuner pair that produces the best signal from a transmitter of a potential duplicate service of the demanded service being presented as a primary service is selected to scan the frequencies from that transmitter. When that secondary demodulator locks onto another service at decision diamond 904, then it may be determined what to do next. For example, at block 906 an antenna/tuner may be added to the scanning function if there is high enough SNR with one tuner feeding the primary demodulator to properly present the demanded primary service. It could get to the point where adequately presenting the primary service requires only two or even one tuner diversity, meaning that other tuners can be dedicated to scanning for a duplicate service. This determination may be made using machine learning if desired by training according to principles herein to determine when to switch antennas in/out of primary/secondary demodulators for optimum performance of extracting data from received signal energy.

Location awareness helps receivers know when other RF signals could become available. Also, knowledge of transmission power levels and mode of operation could inform receivers of expected noise floors and signal energy.

Robust transition to a new frequency may include using thresholds of when a signal is lost as determined at decision diamond 908 permanently due to exiting the RF horizon of a transmitter vs. the receiver simply passing through a temporary obstruction such as a tunnel, as well as thresholds of when a signal is strong enough to ride out channel impairments and the natural variability of signal energy in mobile use cases. Expected signal energy values and noise floors may be used at block 910 to determine when to switch service presentation from a primary service to a secondary (duplicate) service.

Expected signal energy values are useful and can be determined by reading signaled modulation/coding (ModCod), Guard Intervals, Scattered Pilot patterns, multiplexing options, etc. and have a lookup table to correlate the resulting payloads to Bit Interleaved Coded Modulation (BICM) also known as AWGN SNR, Simulated SNR, Lab SNR, Field SNR.

For example, if an actual energy value of a received primary service decreases toward an expected value for approaching the RF horizon of a transmitter, a permanent loss of the signal may be impending and so presentation may be switched to the secondary demodulator or decoder. On the other hand, if an actual energy value of a received primary service is well above an expected value for approaching the RF horizon of a transmitter when the signal is suddenly lost, a temporary loss of the signal may be indicated and so presentation may be maintained using the primary demodulator or decoder for the (expected) brief period of signal outage.

Noise floors require calibration of receiver design. If there is an LNA involved, it should be determined how long are the RF antenna cables, what are the implementation losses of the demodulator and tuner, what is the noise figure of the amplifiers, antennas, tuners, splitters, etc. If all that is designed into the algorithm of tuner selection, then robust operation is possible.

For example, if actual noise on of a received primary service approaches a threshold noise floor, a permanent loss of the signal may be impending and so presentation may be switched to the secondary demodulator or decoder. On the other hand, if actual noise on of a received primary service does not approach a threshold noise floor, presentation may be maintained using the primary demodulator or decoder.

Signal energy continues to vary over time as a device travels through a market. On a per sample basis, determined by sensor readings, antenna selection and directivity can be optimized. Combinations of antennas improves performance. The number of antennas to use to combine either the current configuration (on a primary route path) or signal searching configuration (on a secondary route path) may be determined. This may include knowing which antennas to use to point to known transmitter locations vs. knowing when signal strength will likely become stronger.

Keeping consistent signal strength for service reception improves reliability of the device and broadcast eco-system. Continual monitoring of signal strength and making decisions based on location, known tuner band noise floors, antenna gains, noise figures, expected signal energies, etc. aids improved performance.

If signal energy is expected to become strong in a new market, more antennas can be used in the searching configuration path (secondary) to improve received energy and switch sooner. Choosing proper antennas (e.g., in the front when coming into a new market) in the search configuration aids quicker selection of that path to render services.

The algorithms may be based on a number (such as four) of antennas located on front left, front right, back left, back right of a vehicle. While traveling in good signal area, all antennas may be used to receive a service.

If one or more of the two front facing demodulators show they are not positively contributing to service, they may be switched for use to scan for a partial or duplicate service instead.

It one of the front forward facing tuners locks to A/321 'bootstrap' signal but cannot achieve demodulator ATSC Link-layer protocol (ALP) lock (not enough received energy), it may be determined whether the other front facing antenna is not contributing to the service and if so, the other antenna may be used for repeat testing of enough signal energy in a partial or duplicate channel over time. A programmable hysteresis may use machine learning to find optimum levels of thresholds for determining what is 'enough' signal energy in a channel within a programmable time length.

On the other hand, if a demodulator can achieve ALP lock on the new channel, then it may be used to keep monitoring. The other front antenna may be considered for applying diversity either to the new RF channel or to the existing service on current RF channel.

Algorithms can be based on machine learning to prevent deterioration of existing service while weighting the preparation to handoff diversity gains to a new service in a MFN scenario. Parameters like packet loss, Signal to Noise Ratio, lock indicators, etc. can be the algorithm inputs.

It will be appreciated that whilst present principals have been described with reference to some example embodiments, these are not intended to be limiting, and that various alternative arrangements may be used to implement the subject matter claimed herein.

What is claimed is:

1. In digital television in which at least one receiver can receive broadcast signals from at least first and second digital television broadcast transmitters, a method, comprising:
   identifying respective locations of the transmitters;
   identifying a location of the receiver and at least one parameter of motion of the receiver;
   based at least in part on the respective locations of the transmitters, the location of the receiver, and the parameter of motion of the receiver, identifying at least a first tuner of a multi-tuner chip to provide signals to a primary demodulator or decoder;
   using an output of the primary demodulator or decoder to present a demanded service on at least one display; and
   based at least in part on the respective locations of the transmitters, the location of the receiver, and the parameter of motion of the receiver, identifying at least a second tuner of the multi-tuner chip to scan for a duplicate of the demanded service.

2. The method of claim 1, wherein the digital television receiver comprises an advanced television systems committee (ATSC) 3.0 receiver.

3. The method of claim 1, wherein the multi-tuner chip comprises four tuners.

4. The method of claim 1, comprising, responsive to the second tuner not detecting a duplicate of the demanded service, tuning the second tuner to a frequency associated with the demanded service and providing an output of the second tuner to the primary demodulator or decoder.

5. The method of claim 1, comprising:
   using plural tuners including the first tuner of the multi-tuner chip to provide signals to the primary demodulator or decoder; and
   responsive to identifying that the first tuner provides a signal satisfying a threshold, switching others of the plural tuners from providing signals to the primary demodulator or decoder to providing signals for scanning for the duplicate of the demanded service.

6. The method of claim 1, wherein the parameter of motion comprises direction.

7. The method of claim 1, wherein the parameter of motion comprises speed.

8. The method of claim 1, comprising identifying at least the first tuner of the multi-tuner chip to provide signals to the primary demodulator or decoder at least in part using at least one machine learning (ML) model.

9. An apparatus comprising:
   at least one receiver configured to:
   identify respective locations of first and second transmitters;
   identify a location of the receiver and at least one parameter of motion of the receiver;
   based at least in part on the respective locations of the transmitters, the location of the receiver, and the parameter of motion of the receiver, identify at least a first tuner to provide signals to a primary demodulator or decoder;
   use an output of the primary demodulator or decoder to present a demanded service on at least one display; and
   based at least in part on the respective locations of the transmitters, the location of the receiver, and the parameter of motion of the receiver, identify at least a second tuner to scan for a duplicate of the demanded service.

10. The apparatus of claim 9, wherein the receiver is configured to:
    scan for at least one duplicate of the demanded service using the secondary demodulator or decoder.

11. The apparatus of claim 10, wherein the receiver comprises an advanced television systems committee (ATSC) 3.0 receiver.

12. The apparatus of claim 9, comprising antennae associated with a multi-tuner chip supporting at least one of the tuners.

13. The apparatus of claim 10, wherein the receiver is configured to:
    responsive to the secondary demodulator or decoder not detecting a duplicate of the demanded service, switch an output of a tuner from the secondary demodulator or decoder to the primary demodulator or decoder.

14. The apparatus of claim 10, wherein the receiver is configured to:
    use plural tuners including a first tuner of a multi-tuner chip to provide signals to the primary demodulator or decoder; and
    responsive to identifying that the first tuner provides a signal satisfying a threshold, switch others of the plural tuners from providing signals to the primary demodulator or decoder to providing signals for scanning for the duplicate of the demanded service.

15. The apparatus of claim 9, wherein the parameter of motion comprises direction.

16. The apparatus of claim 9, wherein the parameter of motion comprises speed.

17. A digital television apparatus comprising:
    at least one receiver comprising at least one processor programmed with instructions to configure the processor to:
    identify respective locations of first and second signal sources;
    identify a location of the receiver and at least one parameter of motion of the receiver;
    based at least in part on the respective locations of the signal sources, the location of the receiver, and the parameter of motion of the receiver, identify at least a first tuner to provide signals to a primary demodulator or decoder;
    use an output of the primary demodulator or decoder to present a demanded service on at least one display; and
    based at least in part on the respective locations of the signal sources, the location of the receiver, and the parameter of motion of the receiver, identify at least a second tuner to scan for a duplicate of the demanded service.

18. The digital television apparatus of claim 17, wherein the instructions are executable to:

switch at least one of the tuners to provide input to a different demodulator or decoder at least in part based on a location of at least one transmitter of broadcast digital TV signals.

19. The digital television apparatus of claim 17, wherein the motion parameter comprises direction.

20. The digital television apparatus of claim 17, wherein the motion parameter comprises speed.

\* \* \* \* \*